June 2, 1931. W. E. OWEN, JR 1,808,705
COMBINATION COMPASS PROTRACTOR AND RULER
Filed May 8, 1928
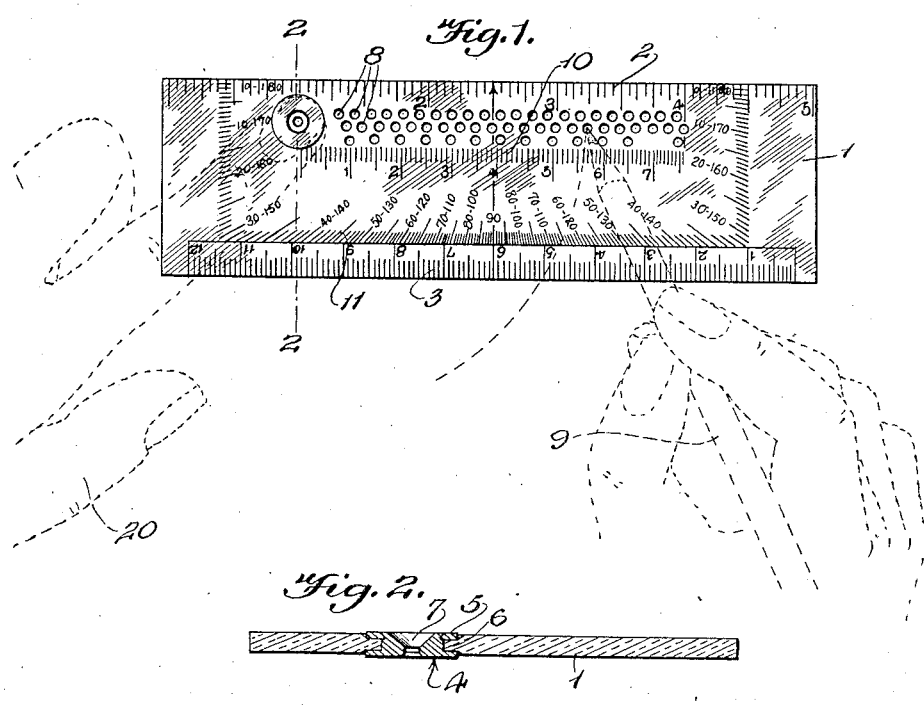
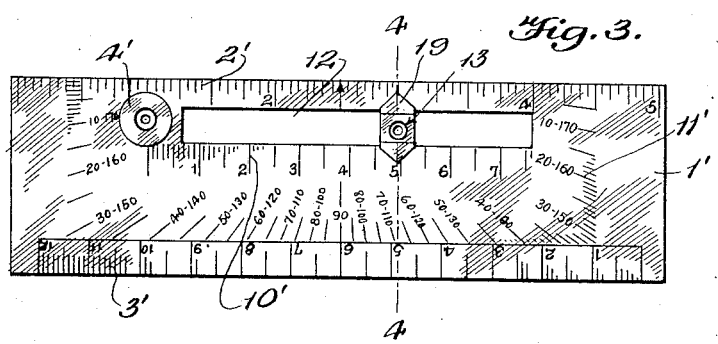
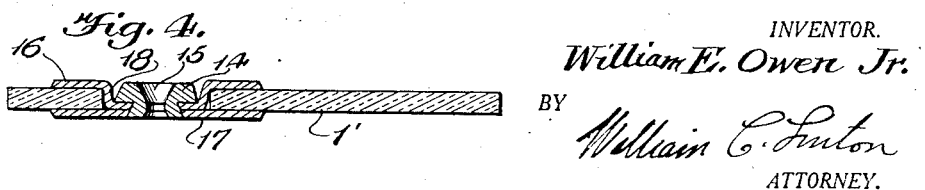
INVENTOR.
William E. Owen Jr.
BY
William C. Linton
ATTORNEY.

Patented June 2, 1931

1,808,705

UNITED STATES PATENT OFFICE

WILLIAM E. OWEN, JR., OF CEDAR RAPIDS, IOWA

COMBINATION COMPASS PROTRACTOR AND RULER

Application filed May 8, 1928. Serial No. 276,124.

This invention relates to improvements in metrical instruments, having for an object to provide a device of this particular character capable, by reason of its simplified form and arrangement, of quantity production, as an article of manufacture, combining in a single instrument, a rule, compass, and protractor especially advantageous for use by architects, engineers, draftsmen, students in geometry, trigonometry, physics, etc., whereby measurements of the English or metric scale may be effected therewith, lines or angles protracted, or arcs, or full circles successfully executed thereby.

Another and equally important object of the invention is to provide a combination device formed with a graduated straight edge adapted for measuring or ruling, the body thereof having a centering eye arranged in the same through which a suitable pivot element is adapted to be engaged, while a pencil or other instrument receiving means is disposed in cooperative relation to the graduations, that markings may be made adjacent and according to the proper or chosen graduation.

Other objects of the invention will be in part obvious and in part pointed out hereinafter.

In order that the invention and its mode of operation for usage may be readily understood by persons skilled in the art to which it appertains, I have in the accompanying illustrative drawings and in the detailed following description based thereupon set out one possible embodiment of the invention.

In the drawings:

Figure 1 is a plan view of the improved combination device showing it in use as a compass;

Figure 2 is an enlarged transverse section through the same taken on the line 2—2 of Figure 1;

Figure 3 is a plan view of a modified form of the device;

Figure 4 is an enlarged transverse section through the same taken on the line 4—4 of Figure 3, Having more particular reference to the drawings, in connection with which like characters of reference will designate corresponding parts, the device may be stated to comprise a body generally indicated herein by the numeral 1 and illustrated as being of substantially rectangular formation, said body being preferably formed of transparent or translucent material, colored if desired; the longitudinal marginal portion of said body, obviously, providing relatively parallel and straight edges, capable of being advantageously used for ruling, while adjacent one of the edges or marginal portions, graduations, indicative of the English linear scale, indicated by the numeral 2 are arranged, such graduations, of course, being suitably presented or inscribed upon one side of the body. Adjacent the remaining longitudinal marginal portion or edge of the body 1 I provide graduations or markings following the metric scale, inscribing or otherwise suitably presenting the same upon the face side of the body 1 as designated by the numeral 3, thus, it will be seen that the longitudinal straight edge portions of the rectangular body 1 will afford effectual measuring instruments in addition to ruling edges.

Rotatably engaged in one end portion of the body 1 and preferably offset from the longitudinal axis thereof is a centering eyelet designated in its entirety at this time by the numeral 4, said eyelet being preferably formed of fiber, metal, or other suitable material possessing the necessary qualities of wear resistance and including in its construction a flanged or shouldered annular body adapted to be snugly yet rotatably received through the aforesaid portion of the body 1, as is shown in the Figure 2, the free portion of the eyelet having a locking washer 5 engaged over the same and secured thereto by scoring or upsetting adjacent portions of the eyelet body as with a chisel, punch or similar device. Thus, it will be seen that the eyelet 4 will be secured to the body 1 in a manner to permit rotation with respect thereto and yet more by reason of the snug engagement with said body prevents any relative radial movement of the eyelet with respect to said body. Also, it will be noted, by reference to the Figure 2, that the portion of the body 1 through which the eyelet 4 is inserted, is slightly reduced, as indicated by the numeral 6, so that the outer sides of the flanged part of the eyelet 4 and the washer 5 will lie substantially flush with the adjacent surfaces of the body. Also, it is preferable that the opening through the eyelet shall have the opposite portions thereof flared, as indicated by the numeral 7, one of said portions being flared more than the other, whereby to facilitate the fixed or positive centering engagement of a finger of the user's hand therewith, in the manner as is illustrated in the Figure 1, in order that the device when used as a compass or a protractor, may be effectually positioned so that its accuracy during pivotal movement of the body 1 with respect to the eyelet 4 will be afforded.

That a pencil or other marking instrument may be advantageously used in connection with the body 1 of the device and especially when said device is utilized as a compass and in some instances as a protractor, I form in relative parallel longitudinally disposed relation within the body 1 a series of perforations, or openings, generally designated by the numeral 8, staggering or offsetting the perforations of the various rows with respect to each other that they may be brought into positions adjacent to said particular graduations, as indicated by the numeral 2, and therefore, that accurate choosing and effecting of proper measurements for the markings to be made, will be facilitated. In this connection, it will be noted upon reference to Figure 1, that in usage of the openings indicated by the numeral 8, a pencil, such as indicated in dotted lines by the numeral 9, is adapted to have the sharpened portion thereof engaged through the particularly chosen opening whereupon a marking, such as a dot, line or arc may be effected upon the material being worked over.

Other graduations, generally indicated by the numeral 10, are inscribed or otherwise presented upon the face side of the body 1 in proximity to and substantially parallelism with respect to said series of openings 9, said graduations being indicative of the metric scale and being particularly advantageous for usage in securing proper measurements and consequently thereupon, the choosing of the particularly adjacent opening 8, whereby a desired or proper marking may be made.

Still other graduations indicated, generally, by the numeral 11, are inscribed or otherwise presented upon the face side of the body portion 1, these graduations being arranged in substantially right angular formation, as is well shown in the Figure 1, and indicating degrees, whereby the device may be effectually used for protracting work.

In the Figures 3 and 4, I have illustrated a slightly modified form of the improved combination device, wherein said device may be stated to comprehend a body portion 1 formed of transparent or translucent material and having substantially rectangular formation, the relative parallel and longitudinal marginal portions of which are formed to constitute straight edges, one of the edges being graduated according to the English scale, as designated by the numeral 2' while the remaining straight edge is graduated according to the metric scale, as indicated by the numeral 3'.

Formed longitudinally of an intermediate portion of the body 1' and preferably, in proximity to that straight edge portion bearing the graduations 2' is a rectangular opening or slot 12 slidably receiving an eyelet or guide device 13 therein, said eyelet or guide device being formed of fiber, metal, or other suitable material, such as conditions or preference may dictate, and including in its construction, a shouldered eye portion 14 having the opposite extremities or portions of the opening therethrough flared, as indicated at 15; said eye portion being secured in its slidable mounting with respect to the slot or way 12 through the medium of arm portions designated by the numerals 16 and 17, said arms being formed with complemental intermediate openings adapted to be bindingly engaged over the reduced and substantially shank-like portions of the eye 15, as is well shown in the Figure 4, the opposite extremities of said arms having sliding and embracing engagement with the opposite sides of the adjacent portions of the body 1'; the intermediate portion of the arm 16 being offset or angled, as indicated by the numeral 18, whereby to effect a positive sliding mounting of the eyelet 13 in said way 12 and at the same time, by reason of the shouldered engagement of the angled portion 18 with the adjacent marginal portions of the way 12, to prevent of relative lateral movement of said eyelet during its longitudinal sliding movement. Also, that the eyelet 13 may be effectually used, that is, that an accurate positioning of the same adjacent the desired or required graduations, may be insured, the arm 16 is formed with reduced or pointed extremities 19, the meeting angles of which are in true alinement with the eye portion 14 for obvious purposes.

This eyelet 13 is adapted to be used in substitution for the series of openings or perforations illustrated in the Figure 1 and identified by the numeral 8, the eye portion 14 serving to receive a pencil or other marking instrument therethrough, whereupon the eyelet may be slid or adjusted to any desired position throughout the length of the slot or way 12 receiving it, hence permitting its setting at any radius whether the device is used as a compass or at any point when used as a protractor, thereby permitting of a finer adjustment and consequently, more accurate work.

That the eyelet 13 may be adjusted in accordance with the metric scale, I may and preferably do inscribe or otherwise present upon the face side of the body 1' adjacent to and throughout the length of the slot 12, graduations, or markings indicative of the metric measurement, as indicated by the numeral 10', that a user of the device, may, by alining the pointed extremities 19 of the arm 16 adjacent any particular marking or graduation, secure the proper measurement, radius, etc.

Rotatably mounted in one end portion of the body 1' and laterally offset from the longitudinal axis thereof is a centering eyelet 4', corresponding in construction, and mounting to the eyelet identified in the preceding embodiment and serving for a corresponding purpose.

In addition to the metric measurements 2', 3' and 10' inscribed upon the face side of the body portion 1', I also pivotally present upon this particular side of said body, graduations, generally indicated by the numeral 11', that the device may be effectually or advantageously used as a protractor.

The mode of usage of the improved combination device as a ruler or measuring device, wherein the graduated straight edge portions 2, 2', or 3 or 3' are used, is obvious. When it is desired to use the improved device as a compass, a pivot device, such for example as the finger of the user's hand, illustrated in the Figure 1, and identified by the numeral 20 is engaged over the centering eyelet whereupon the desired radius or measurement is ascertained as the point of the particular marking device employed is engaged through the adjacent perforation 8 or through the eye portion 14 of the eyelet 13, as regards the embodiment of the invention disclosed in the Figures 3 and 4. At this time, the body 1 is swung upon the centering eyelet whereupon an arc, circle, or other marking of the desired degree will be effected. Also, it will be understood that the device, when used as a protractor, may be swung to the desired or proper angle with respect to the sheet being worked upon, by swinging the same about that point or intermediate portion indicated by the arrow 21 to the proper position for protracting.

Manifestly, the constructions shown herein are capable of further modification and therefore, such modification as is within the scope of my claim, I consider to be within the spirit of the invention.

I claim:

A device of the character described comprising a transparent body portion formed with relatively parallel straight edge sides having graduated markings indicative of linear measurements upon its face side and adjacent to said straight edge sides, a portion of said body in parallel proximity to one straight edge side having a plurality of relatively parallel rows of spaced openings formed therein, the various openings of said rows being staggered with respect to the openings of the adjacent row, a centering eyelet mounted in said body portion adjacent one end of the parallel rows of spaced openings and in substantially longitudinal alinement with one row and said face side of the body portion having linear markings thereupon adjacent one edge, all of said last mentioned markings converging toward a common center adjacent the opposite edge.

In witness whereof I have hereunto set my hand.

WILLIAM E. OWEN, Jr.